(12) United States Patent
Kobelt

(10) Patent No.: US 7,857,109 B2
(45) Date of Patent: Dec. 28, 2010

(54) ADJUSTABLE CAM ACTUATED BRAKE ASSEMBLY

(75) Inventor: Jacob Kobelt, Surrey (CA)

(73) Assignee: Interkob Holdings Ltd., British Columbia (CA)

( * ) Notice: Subject to any disclaimer, the term of this patent is extended or adjusted under 35 U.S.C. 154(b) by 595 days.

(21) Appl. No.: 11/581,223

(22) Filed: Oct. 13, 2006

(65) Prior Publication Data

US 2008/0087505 A1   Apr. 17, 2008

(51) Int. Cl.
*F16D 55/02* (2006.01)
(52) U.S. Cl. .................................. 188/71.8; 188/196 B
(58) Field of Classification Search ................ 188/72.7, 188/59, 71.8, 196 B, 200
See application file for complete search history.

(56) References Cited

U.S. PATENT DOCUMENTS

| | | | |
|---|---|---|---|
| 2,522,181 A * | 9/1950 | Krikorian | 188/79.62 |
| 2,979,164 A * | 4/1961 | Altherr | 188/59 |
| 3,513,656 A | 5/1970 | Engle | |
| 3,647,030 A | 3/1972 | Burnett | |
| 3,815,471 A | 6/1974 | Kobelt | |
| 3,881,782 A | 5/1975 | Skoyles | |
| 3,893,549 A | 7/1975 | Bennett | |
| 3,944,027 A | 3/1976 | Yamamoto | |
| 3,946,837 A | 3/1976 | Houser | |
| 3,973,806 A | 8/1976 | Inada et al. | |
| 3,986,584 A * | 10/1976 | Wright et al. | 188/71.8 |
| 4,016,959 A * | 4/1977 | Menard et al. | 188/196 B |
| 4,121,697 A | 10/1978 | Kobelt et al. | |
| 4,184,573 A | 1/1980 | Bricker et al. | |
| 4,530,209 A | 7/1985 | Steffes | |
| 4,725,103 A | 2/1988 | Watanabe | |
| 4,776,439 A * | 10/1988 | Tickle et al. | 188/71.8 |
| 4,856,622 A | 8/1989 | Sartain et al. | |
| 5,700,067 A | 12/1997 | Heubner | |
| 5,826,953 A | 10/1998 | Heubner | |
| 6,367,591 B1 * | 4/2002 | Gosda | 188/71.8 |
| 7,025,181 B2 | 4/2006 | Affeldt et al. | |

FOREIGN PATENT DOCUMENTS

GB         1 267 558        3/1972
WO   WO 2006/030293 A1   3/2006

* cited by examiner

*Primary Examiner*—Bradley T King
(74) *Attorney, Agent, or Firm*—Townsend and Townsend and Crew LLP

(57) ABSTRACT

In a cam actuated brake, an adjustable cam disposable intermediate a pair of following surfaces on first ends of a pair of arms. The arms being rotatable about parallel axes and having a pair of opposing brake surfaces at second ends. The cam comprises a body having a first and second opposite cam surfaces adapted to engage the following surfaces and a bore intermediate the cam surfaces and a piston receivable in the bore. The piston is releasably coupled to the bore. The cam further comprises an adjuster for varying the position of the piston in the bore. The piston may be engaged by an actuator so as to wedge the cam between the following surfaces of the arms so as to rotate the first and second arms about their respective axes thereby frictionally engaging an object between the braking surfaces.

24 Claims, 5 Drawing Sheets

ADJUSTABLE CAM ACTUATED BRAKE ASSEMBLY

BACKGROUND OF THE INVENTION

1. Field of Invention

The present invention relates generally to brakes and in particular to an apparatus for adjusting a cam actuated brake.

2. Description of Related Art

Brakes for rotating disks are well known. A common brake for such disks is known as a caliper brake. A caliper brake provides a pair of brake pads disposed on either side of the rotating disk. Each brake pad may be attached to an arm at a proximate end. The arms are rotatable about an intermediate axis and actuated by an actuator between the distal ends thereof.

An example of a cam actuated caliper brake assembly is shown in U.S. Pat. No. 4,121,697 to Kobelt et. al. the entirety of which is incorporated herein by reference. U.S. Pat. No. 4,121,697 to Kobelt et al. provides a wedge or cam between a pair of followers on the distal ends of the arms.

A present difficulty with disk brakes arises due to wear of the brake pads. As the brake is used, the brake pads are worn or abraded away. As the thickness of the brake pads is reduced due to wear, the arms of the caliper brake are required to pivot through a greater angle to cause the brake pads to contact the disk. The actuator is therefore required to displace the distal ends of the arms by a greater distance. In the case of a cam actuated caliper brake assembly, the wedge or cam will be required to be displaced by a greater distance by the actuator. Unfortunately, many actuators in use for brakes typically have a relatively short stroke due to the primary design considerations being applicable force and modulation as opposed to stroke length.

In addition, many actuators have a spring return or release whereby the actuator returns to a fully retracted position when the brake is not being applied. In cam actuated brakes, such as in U.S. Pat. No. 4,121,697 to Kobelt et al., the retraction of the actuator may cause the wedge or cam to be retracted from engagement upon the following surfaces. In this retracted position, the contact surfaces between the following surfaces and the wedge or cam may become fouled or misaligned from each other.

One solution to the problem of brake pad wear is to provide an actuator having a longer stroke. While this solution will enable the brake pads to contact the disk over a larger range of brake pad wear, this solution will not prevent the disengagement of the wedge or cam from the cam followers. Such actuators may also be more expensive than those traditionally used and suffer from deficiencies in applicable force and modulation.

Another solution is to provide a link with an adjustable length between the actuator and the wedge or cam. The length of such a link may be adjusted so as to remove any slack caused by brake pad wear. Such an adjustable link requires that the length be adjusted periodically so as to ensure proper operation of the brake. The process of adjusting such a link, however, requires that the brake not be in operation during the time of the adjustment. Because the brake may be used as an emergency safety device in some operations, this will require that all of the surrounding equipment similarly be stopped during the adjustment. The resulting shutdown time may be quite expensive in some industries, such as, for example, oil drilling.

What is desirable is an adjusting cam actuated brake assembly that may be rapidly adjusted to compensate for brake pad wear.

SUMMARY OF THE INVENTION

The present invention provides an adjustable cam actuated brake assembly that may be rapidly adjusted to compensate for brake pad wear.

According to a first embodiment of the present invention there is provided a brake actuating cam disposable intermediate a pair of following surfaces on first ends of a pair of arms. The arms are rotatable about parallel axes and have a pair of opposing brake surfaces at second ends. The cam comprises a body having first and second opposite cam surfaces adapted to engage the following surfaces and a bore intermediate the cam surfaces. The cam further comprises a piston receivable in the bore, the piston being releasably coupled to the bore and an adjuster for varying the position of the piston in the bore. The piston may be engaged by an actuator so as to wedge the cam between the following surfaces of the arms so as to rotate the first and second arms about their respective axes thereby frictionally engaging an object between the braking surfaces.

According to a further embodiment of the present invention there is provided a brake apparatus. The apparatus comprises a pair of opposed arms rotatable about parallel axes having first and second ends. The first ends are adapted to be coupled to opposing brake pads to brake a disk therebetween. The second ends have cam following surfaces. The apparatus further comprises an actuated cam disposed intermediate the cam following surfaces. The cam comprises a body having first and second opposite cam surfaces for engaging the cam following surfaces and a bore intermediate the cam surfaces. The cam further comprises a piston receivable in the bore, the piston being releasably coupled to the bore. The cam further comprises an adjuster for varying the position of said piston in said bore.

BRIEF DESCRIPTION OF THE DRAWINGS

In drawings which illustrate embodiments of the invention.

DETAILED DESCRIPTION

Figure 1:
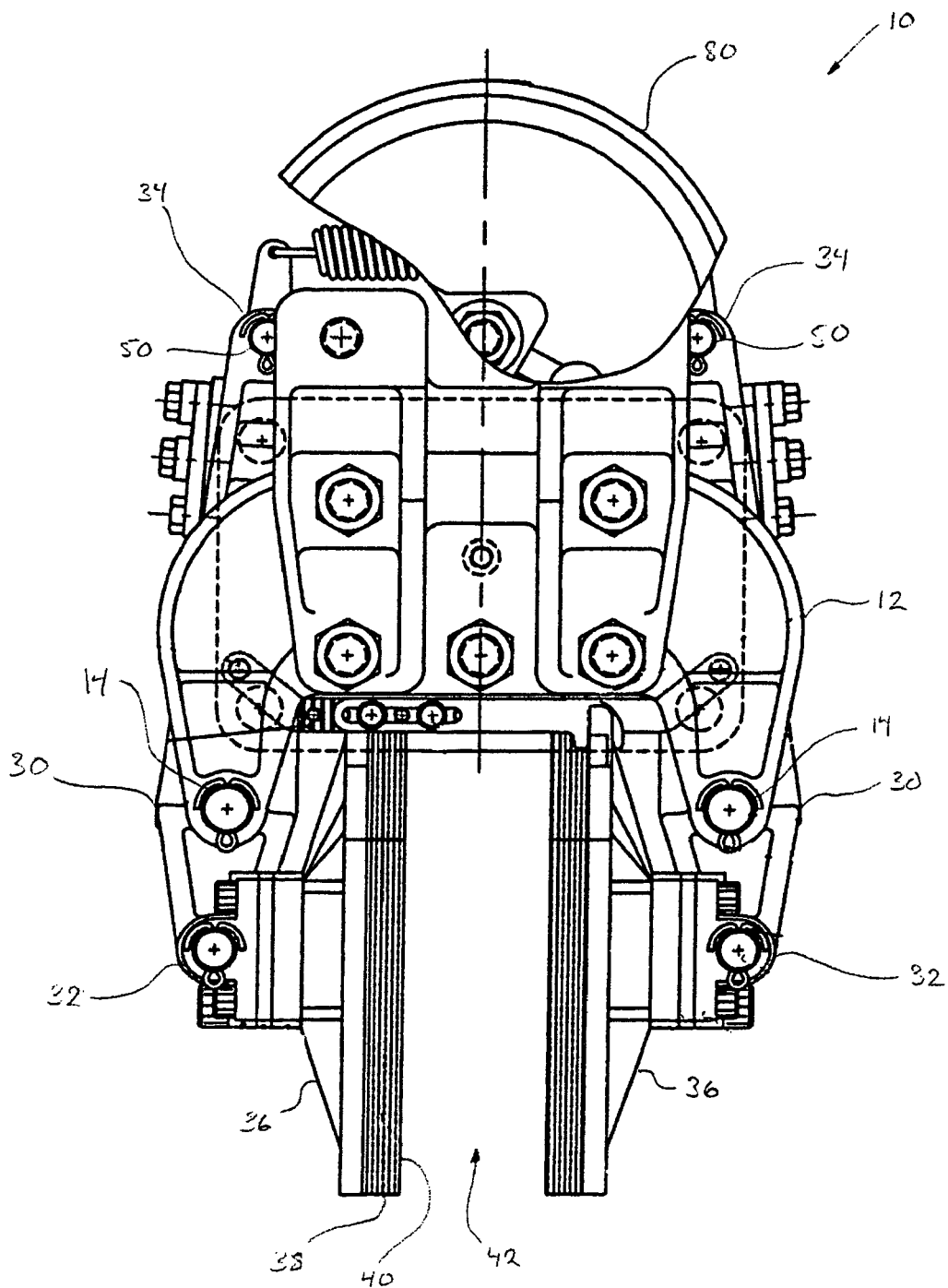
FIG. 1 is a plan view of a first embodiment of an exemplary brake assembly according to the present invention.

Referring to FIG. 1, a brake assembly according to a first embodiment of the invention is shown generally at 10. The brake assembly 10 comprises a frame 12, supporting a pair of arms 30 and an actuator 80. The frame 12 comprises a body having a pair of spaced pivots 14 pivotally supporting the arms 30.

The arms 30 comprise elongated members having first and second ends 32 and 34, respectively. Arms 30 are rotatably connected to the frame 12 at pivots 14. The arms support a brake pad assembly 36 at each first end 32. The brake pad assemblies include brake pads 38 having brake pad surfaces 40 disposed adjacent and opposite each other to form a passage 42 therebetween. The passage may receive a disk brake (not shown) or other object to be braked or retained.

Figure 2:
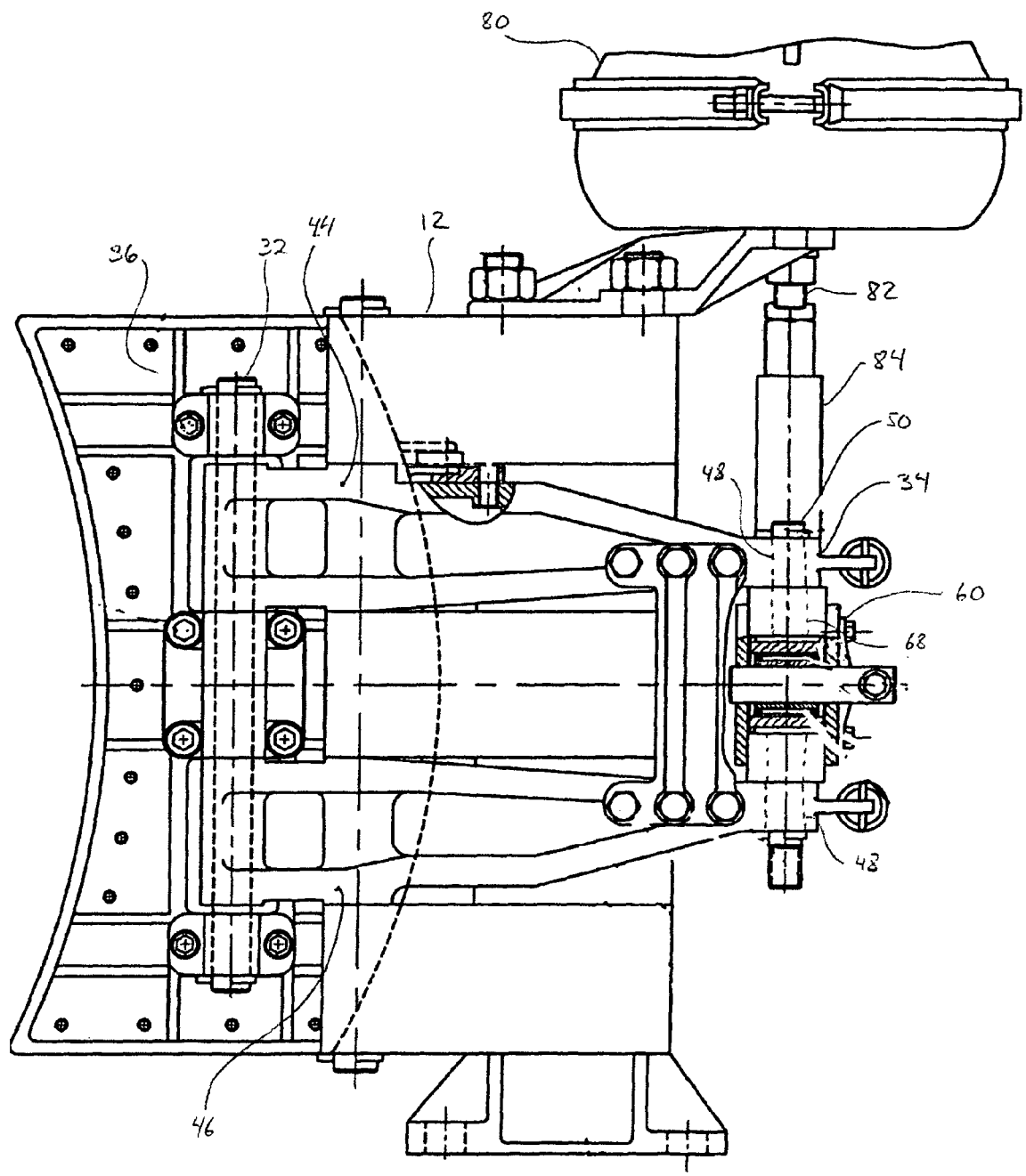
FIG. 2 is a side elevation view of the brake assembly of FIG. 1.

Referring now to FIG. 2, a side elevation view of the brake apparatus is shown in which the second ends 34 of the arms 30 have a cam following assembly 60. In the embodiment shown in FIG. 2, the arms 30 are forced from first upper and second lower arm portions 44 and 46, respectively. The second ends 34 of the first and second arm portions 44 and 46 each include a bore 48 able to receive a roller pin 50. The roller pin 50 is received within a coaxial bore 68 in cam following assembly 60 so as to rotatably connect the cam following assembly to the second end 34 of the arms 30.

Figure 3:
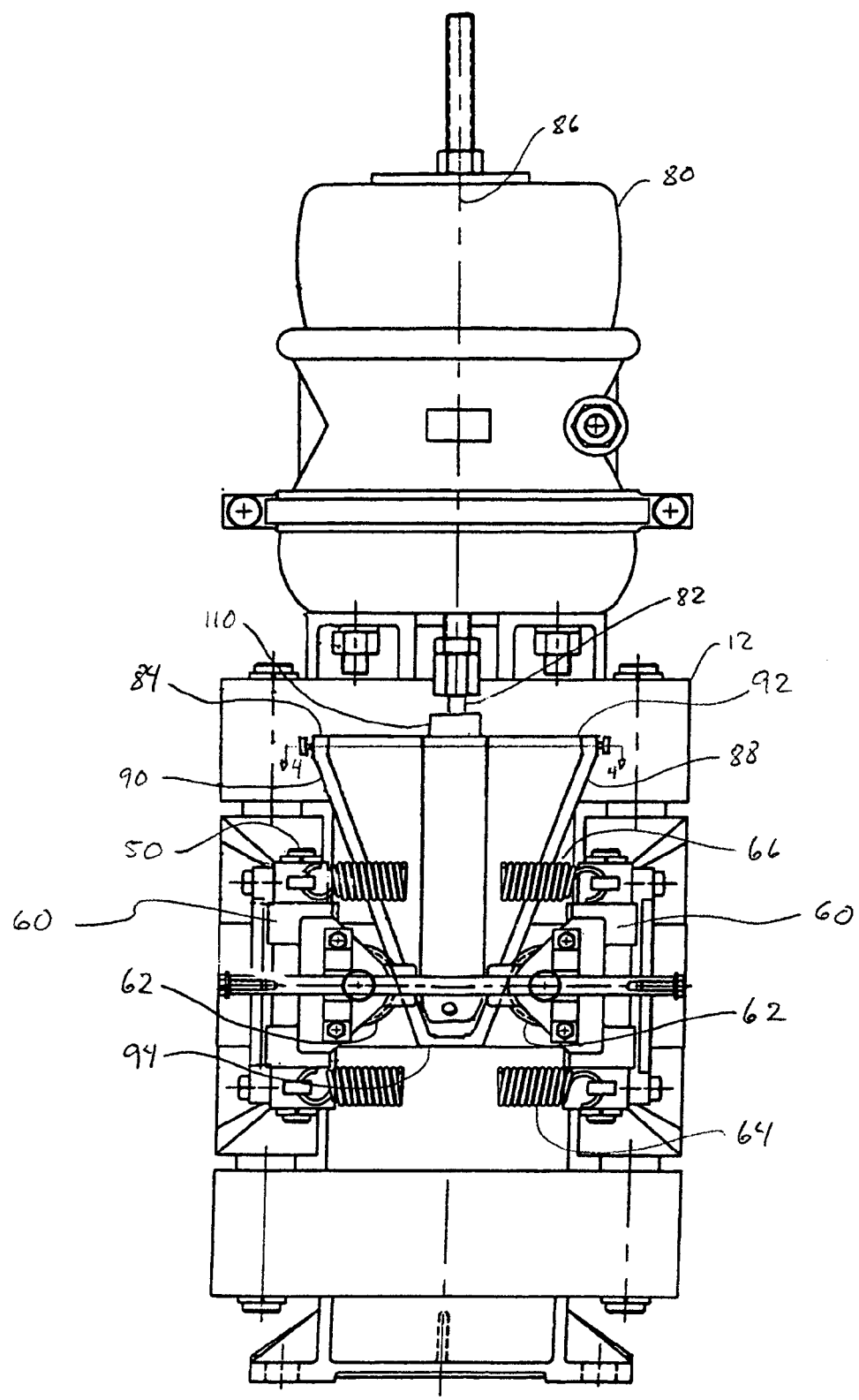
FIG. 3 is a rear elevation view of the brake assembly of FIG. 1.

FIG. 3 shows a rear elevation view of the brake assembly. Cam following assembly 60 comprises a body having a first axis of rotation defined by the roller pin 50, includes a cam follower or roller 62. Roller 62 comprises a cylindrical body rotatably connected to the cam following assembly 60 about an axis perpendicular to the first axis. The second ends 34 of the two arms 30 are further biased towards each other by means of springs 64 and 66.

The actuator 80 is connected to the frame 12 and includes an actuator rod 82 driving a cam or wedge 84 disposed about the actuator axis 86. The actuator axis is in planar alignment with the rollers 62 such that the wedge 84 is disposed between the rollers 62. The cam or wedge 84 comprises a wedge shaped body having first and second angularly disposed cam surfaces 88 and 90, and a proximate and distal end 92 and 94, respectively. The first and second cam surfaces are oriented such that they are closer together at the distal end 94 of the wedge than at the proximate end 92.

Figure 4:
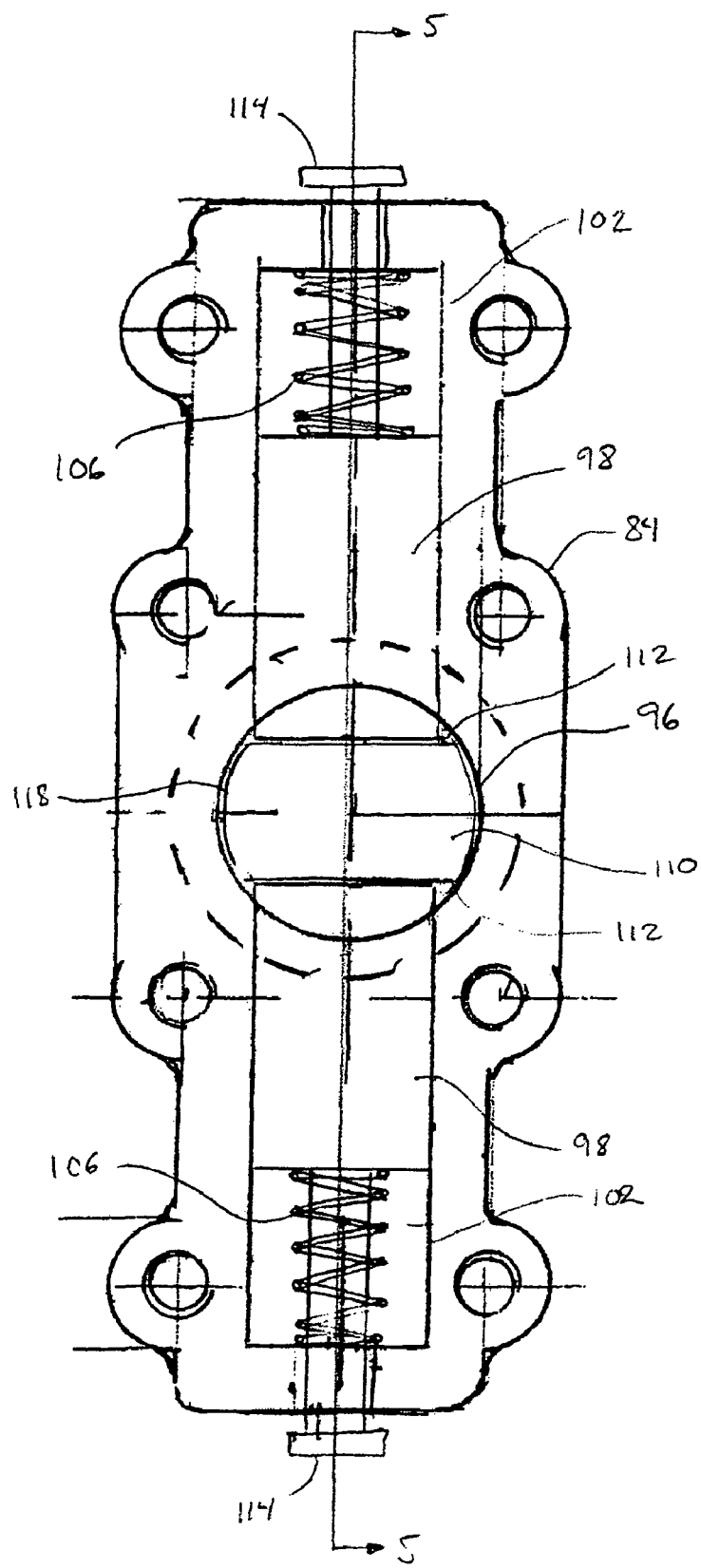
FIG. 4 is a cross sectional view of the brake assembly of FIG. 1 taken along the line 4-4 in FIG. 3.

Referring now to FIG. 4, a cross sectional view of the cam or wedge 84 is shown taken along line 4-4 of FIG. 3. The wedge further includes a pair of retaining pins 98 and a central bore 96 coaxial with the actuator axis 86. The retaining pins 98 are received in opposed transverse slots 102 in the wedge 84. Slots 102 extend perpendicularly to the central bore 96. The central bore contains a notched piston 110 moveable longitudinally within in the bore. The notched piston includes a plurality of notches 112 on opposite longitudinal sides oriented so as to be engagable by retaining pins 98. The retaining pins 98 are biased toward central bore 96 and notches 112 by springs 106. The retaining pins may also include retraction pins 114. The retraction pins may be grasped by a user to retract the retaining pins 98 out of engagement with the notches 112 on the notched piston 110.

Figure 5:
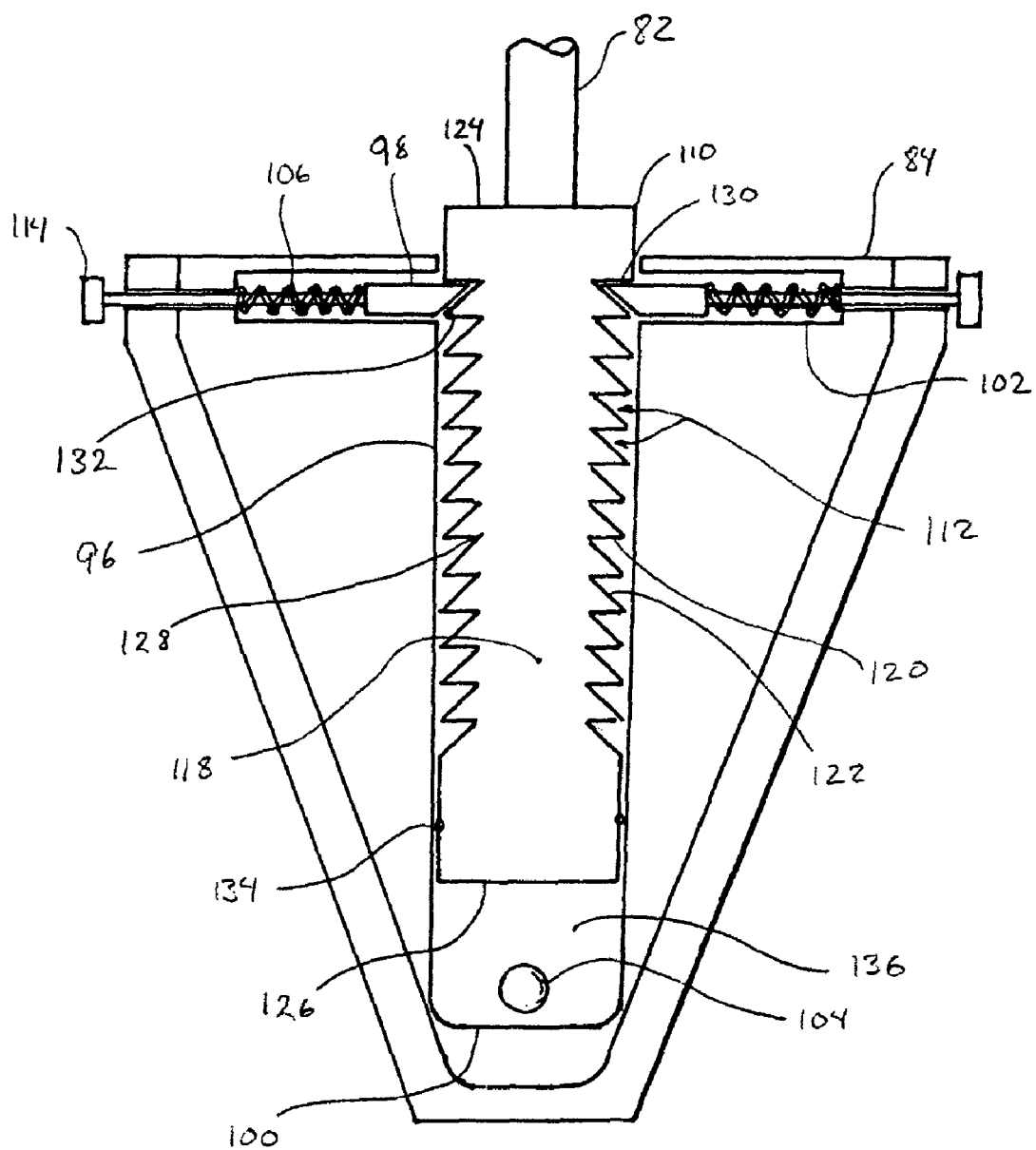
FIG. 5 is a cross sectional view of the wedge of FIG. 4 taken along the line 5-5 of FIG. 4.

Referring now to FIG. 5, a longitudinal cross sectional view of the wedge 84 and notched piston 110 is shown taken along line 5-5 of FIG. 4. As described above, the notched piston 110 is received within bore 96 in the wedge 84 and includes first and second ends 124 and 126, respectively. The retaining pins 98 are received within opposed, transverse slots 102 and biased against the notches 112 in the notched piston. The notched piston is connected to actuator rod 82 and has a substantially cylindrical shape wherein the notches 112 are disposed on opposite sides of the notched piston. The notched piston also includes semi-circular side regions 118 which are substantially complementary with the shape of the bore 96.

The notches 112 include a retaining surface 120 and an advancing surface 122. The retaining surface 120 is substantially parallel to the retaining pins 98. The advancing surface 122 comprises a planar surface extending between an inside edge 128 of an retaining surface to the outside surface of the notched piston 110 at a position towards the second end 126 of the notched piston relative to the retaining surface 120. The retaining pins 98 include retaining surfaces 130 corresponding to the retaining surface of the notches 112. The retaining pins 98 also include advancing surface 132 corresponding to the advancing surfaces 122 of the notches 112.

The bore 96 includes a bottom surface 100 and a fluid supply port 104. The fluid supply port may be threaded so as to accept a threaded supply line and is operable to supply a fluid supply to the bottom of the bore 96. The second end 126 of the notched piston 110 includes a sealing means 134 such as for example an O-ring disposed around the notched piston proximate to the second end 126. The second end 126 of the notched piston 110 and the bottom surface 100 of the bore 96 co-operate to form a chamber 136 for receiving the fluid supply.

Operation

Referring FIGS. 1-3, in operation, when the brake apparatus is required to brake the disk in passage 42, the actuator 80 is supplied with an actuation signal such as for example, a hydraulic, pneumatic, or electrical signal. The actuator 80, in response to the actuation signal, displaces the actuator rod 82 and the cam or wedge 84 towards the following rollers 62. As the wedge is driven between the rollers 62, the rollers and thereby the following assemblies 60 are forced apart by the first and second cam surfaces 88 and 90. The outward movement of the cam following assemblies 60 correspondingly rotates the second ends 34 of the arms 30 outwardly about the pivots 14. The rotation of the arms about pivots 14 causes the first ends 32 and thereby the brake pad assemblies to be displaced towards each other to narrow the width of the passage 42. After a sufficient movement of the brake pads 38, the brake pad surfaces 40 will frictionally engage the disk therebetween to provide a braking force to the disk.

Now referring to FIG. 4, the actuating movement of the actuator rod 82 is transmitted to the wedge 84 through the notched piston 110. As the notched piston 110 is moved towards the following rollers 62, the retaining surfaces 120 of the notched piston bear against the corresponding retaining surfaces 130 of the retaining pins 98. The retaining pins are further held in engagement in the notches 112 by the springs 106.

When the disk pad have become worn or abraded such that adjustment of the brake apparatus is necessary, a pressurized fluid supply is provided to the fluid supply port 104 and thereby into the chamber 136. The fluid in the chamber 136 will displace the notched piston 110 relative to the wedge 84 out of the bore 96. The advancing surfaces 122 of the notched piston 110 will cause the advancing surfaces 132 of the retaining pins to retract the retaining pins against the springs 106. When a sufficient displacement of the notched piston has been achieved, the retaining pins 98 will be engaged in the next pair of successive notches 112 and the slack in the brake assembly will be reduced.

When new brake pads 38 are to be supplied to the brake apparatus, the brake apparatus will need to be returned to an initial position. The retraction pins 114 may be grasped by a user and pulled away from each other so as to retract the retaining pins 98 into the slots 102. The retaining surfaces 130 of the retaining pins 98 will then be disengaged from retaining surfaces 120 of the notches 112. The notched piston 110 may then be displace within bore 96 towards the bottom surface 100 so as to return the brake apparatus to an initial position.

In an alternative embodiment, the notched piston 110 may be rotated, such that the retaining pins 98 are caused to be displace out of the notches 112 and onto the side regions 118 of the notched piston 110. When the retaining pins are retracted by the side regions 118 and no longer in engagement with the notches 112, the notched piston may be displaced with the bore 96 towards the bottom surface 100 so as to return the brake apparatus to an initial position. It will be appreciated that in this alternative embodiment, the retraction pins 114 are not necessary.

While specific embodiments of the invention have been described and illustrated, such embodiments should be considered illustrative of the invention only and not as limiting the invention as construed in accordance with the accompanying claims.

What is claimed is:

1. A brake actuating cam disposable intermediate a pair of following surfaces on first ends of a pair of arms, the arms being rotatable about parallel axes and having a pair of opposing brake surfaces at second ends, the cam comprising:
    a body having first and second opposite cam surfaces adapted to engage said following surfaces and a bore intermediate said cam surfaces;
    a piston receivable in said bore, said piston being releasably coupled to said bore; and
    an adjuster for controllably varying the position of said piston in said bore,
    wherein said piston may be engaged by an actuator via said brake actuating force so as to wedge said cam between the following surfaces of the arms so as to rotate the first and second arms about their respective axes thereby frictionally engaging an object between the braking surfaces,
    wherein said bore includes an end surface located between the cam surfaces, said piston being located between the end surface and the actuator, said bore adapted to receive a pressurized fluid between said piston and said end surface so as to displace said piston away from said end surface.

2. The brake actuating cam of claim 1 wherein said fluid comprises a hydraulic fluid.

3. The brake actuating cam of claim 1 wherein said fluid comprises air.

4. The brake actuating cam of claim 1 wherein said piston is displaceable in said bore in one direction and restrained from being displaced in the other direction.

5. The brake actuating cam of claim 4 wherein said piston is displaceable in said bore in a first direction towards said actuator and restrained from being displaced in a second direction away from the actuator.

6. The brake actuating cam of claim 5 wherein said piston includes a plurality of notches, said body further including at least one pin selectively engageable with at least one of said plurality of notches such that said at least one pin permits said piston to be displaced in said first direction relative to said body and opposes displacement of said piston in said second direction relative to said body.

7. The brake actuating cam of claim 6 wherein said at least one pin has a first face perpendicular to said body and a second face extending angularly from an opposing surface of said at least one pin to said first face at an end of said at least one pin.

8. The brake actuating cam of claim 7 wherein each one of said plurality of notches has first and second faces corresponding to said first and second faces of said at least one pin.

9. The brake actuating cam of claim 6 wherein said at least one pin is selectively engageable with at least one of said plurality of notches due to a biasing force of at least one spring.

10. The brake actuating cam of claim 6 wherein said at least one pin comprises a pair of pins disposed on opposing sides of said piston.

11. The brake apparatus of claim 1 wherein said actuator comprises an actuator rod extending from said piston according to a length, said length determining a non-engaged distance between said object and said braking surfaces, and wherein said pressurized fluid displaces said piston relative to said cylinder to increase said length and decrease said non-engaged distance.

12. The brake apparatus of claim 11 wherein said piston and said cylinder ratchet with respect to each other in an increasing direction of said length.

13. A brake apparatus, the apparatus comprising:
    a pair of opposed arms rotatable about parallel axes having first and second ends, said first ends adapted to be coupled to opposing brake pads to brake a disk therebetween, said second ends having cam following surfaces; and
    an actuated cam disposed intermediate said cam following surfaces, said cam comprising:
    a body having first and second opposite cam surfaces for engaging said cam following surfaces and a bore intermediate said cam surfaces;
    a piston receivable in said bore, said piston being releasably coupled to said bore; and
    an adjuster for controllably varying the position of said piston in said bore,
    wherein said piston may be engaged by an actuator via said brake actuating force,
    wherein said bore includes an end surface located between the cam surfaces, said piston being located between the end surface and the actuator, said bore adapted to receive a pressurized fluid between said piston and said end surface so as to displace said piston away from said end surface.

14. The brake apparatus of claim 13 wherein said fluid comprises a hydraulic fluid.

15. The brake apparatus of claim 13 wherein said fluid comprises air.

16. The brake apparatus of claim 13 wherein said piston is displaceable in said bore in one direction and restrained from being displaced in the other direction.

17. The brake apparatus of claim 16 wherein said piston is displaceable in said bore in a first direction towards said actuator and restrained from being displaced in a second direction away from said actuator.

18. The brake apparatus of claim 17 wherein said piston includes a plurality of notches, said body further including at least one pin selectively engageable with at least one of said plurality of notches such that said at least one pin permits said piston to be displaced in said first direction relative to said body and oppose displacement of said piston in said second direction relative to said body.

19. The brake apparatus of claim 18 wherein said at least one pin has a first face perpendicular to said body and a second face extending angularly from an opposing surface of said at least one pin to said first face at an end of said at least one pin.

20. The brake apparatus of claim 19 wherein each one of said plurality of notches has first and second faces corresponding to said first and second faces of said at least one pin.

21. The brake apparatus of claim 18 wherein said at least one pin is selectively engageable with at least one of said plurality of notches due to a biasing force of at least one spring.

22. The brake apparatus of claim 18 wherein said at least one pin comprises a pair of pins disposed on opposing sides of said piston.

23. The brake apparatus of claim 13 wherein said actuator comprises an actuator rod extending from said piston according to a length, said length determining a non-engaged distance between said object and said braking surfaces, and wherein said pressurized fluid displaces said piston relative to said cylinder to increase said length and decrease said non-engaged distance.

24. The brake apparatus of claim 23 wherein said piston and said cylinder ratchet with respect to each other in an increasing direction of said length.

* * * * *